METHOD OF CONTINUOUSLY CURING RESISTOR ELEMENTS

Filed Aug. 15, 1966

INVENTORS
HANS E. DIETSCH
JOHN GOW III
ROHINTON J. SURTY

BY Wolmar J. Stoffel
ATTORNEY

United States Patent Office 3,458,352

Patented July 29, 1969

3,458,352

METHOD OF CONTINUOUSLY CURING RESISTOR ELEMENTS

Hans E. Dietsch, Fishkill, John Gow III, Marlboro, and Rohinton J. Surty, Wappingers Falls, N.Y., assignors to International Business Machines Corporation, Armonk, N.Y., a corporation of New York Filed Aug. 15, 1966, Ser. No. 572,543

Int. Cl. H01b *1/02;* C03c *7/10;* B44d *1/46*

U.S. Cl. 117—227 9 Claims

ABSTRACT OF THE DISCLOSURE

The invention relates to a method of curing resistors in which a mixture comprising glass frit and a metal-metal oxide conductive material is fired under controlled heating conditions to produce resistors having improved stability characteristics.

This invention relates to an improved method of curing electrically conductive elements, more particularly to an improved method of continuously curing resistor elements formed of a paste mixture supported on backing elements, which mixture includes glass frit and a metal-metal oxide conductive material. The method is based on the discovery that certain phases of curing resistor pastes are relatively insensitive to the rate at which the temperature is increased, while other phases are quite sensitive. The method is the practical utilization of this discovery to produce a more efficient curing cycle.

In general, resistor pastes are essentially composed of glass frit, a finely divided conductive material, and an organic vehicle. The conductive material in the resistor element provides a path for the flow of electrical current. The vehicle gives the paste fluid characteristics which facilitate the printing of the resistors. The glass frit provides an integral matrix structure that supports the particles of the conductive material and maintains same in a given fixed relationship on a suitable supporting base. During the curing, conventionally referred to as "firing," the vehicle is driven out or burnt off the resistor element, and the glass melted into a "glaze."

It is well known in the art that in curing printed resistors, the temperature of the paste of the resistor element must be increased at a relatively low rate for best results. When the temperature of the resistor is increased too rapidly to the firing temperature, the resultant resistor is porous and brittle, and has poor electrical and stability characteristics. After the temperature of the resistor is raised to the firing temperature, the resistor should be maintained at the firing temperature for a time sufficient to allow the glaze to stabilize to form a relatively uniform integral matrix structure.

It is well known to cure resistors by the batch process wherein a large quantity of substrates having resistors printed thereon, are simultaneously placed in an oven, or other suitable enclosure, and the temperature raised to the firing temperature, the firing temperature maintained for suitable interval, and the oven subsequently cooled. This intermittent or batch process generally entails a great deal of manually handling and is slow and time consuming. This process is not generally suited to modern mass production technology where electronic components are completely fabricated and assembled on a production line.

Continuous curing of printed resistors by conveying through a furnace is also old in the art. Normally the substrates having resistors printed thereon are moved by a chain conveyor through a long tunnel-like furnace. The furnace is divided into zones of different temperature environments. In order to heat the resistors at production line volume rates from room temperature to the firing temperature at a desirably slow temperature rise rate, the furnace must be very long. There is a direct correlation between conveyor speed and furnace length. Also, the conveyor must be operated above a minimum lower velocity to obtain a practical degree of heating control. Thus, the furnace will require a large, possibly prohibitive capital investment, and also require a large amount of floor space. In order to reduce the length of the furnace to thereby reduce the capital investment and space requirements, it would entail increasing the temperature rise rate, or shortening the firing time, or a combination thereof. This would normally result in an inferior or possibly an unacceptable product.

An object of this invention is to provide an improved method of continuously curing conductive elements formed of a paste mixture.

Another object of this invention is to provide an improved and more efficient method of continuously curing electrically conductive elements formed of a paste mixture including glass frit, a vehicle, and a metal-metal oxide conductive material.

Yet another object of this invention is to provide an improved method of continuously curing resistor elements which results in elements having a dense structure, an improved temperature coefficient of resistance, and improved drift stability characteristics.

Yet another object of this invention is to provide a new method of continuously curing electrically conductive elements which can be carried out on apparatus that requires a minimum of floor space.

Another object of this invention is to provide an improved method of continuously curing electrically conductive elements which can be carried out by apparatus that requires a relatively low capital investment.

Yet another object of this invention is to provide an improved method of continuously curing electrically conductive elements that combines maximum production throughput rates with desirable optimum firing treatment with respect to resistor stability and physical characteristics.

Another object of this invention is to provide an improved method of continuously curing resistor elements which makes possible the most efficient use of firing apparatus.

Another object of this invention is to provide an improved method which results in a more efficient heating profile.

In the continuous method of our invention of curing electrically conductive elements adhered to a substrate and formed of a paste mixture including glass frit, a vehicle, and a metal-metal oxide conductive material, the elements are initially heated up to a first temperature, which is approximately equal to the softening temperature of the glass frit, at an average temperature rise rate of not less than 25° C. per minute. The elements are further heated to a second temperature of from 80 to 150° C. above the first mentioned temperature at an average temperature rise rate at least one-third less than the initial temperature rise rate. The elements are then maintained at the second temperature until the evolution of gas is substantially terminated, indicating that an equilibrium condition exists. The elements are subsequently cooled.

The method of our invention of continuously curing electrically conductive elements solves many problems associated with the continuous curing of conductive elements. The method can be practiced with apparatus requiring a significantly lower capital investment than is required when using conventional curing methods. The method results in a firing profile that combines maximum production throughput rate with desirable optimum firing treatment. Further, the apparatus required to practice the method of the invention occupies less floor space than apparatus necessary to produce comparable resistors by known means of firing. The method utilizes a firing profile wherein the temperature of the elements is increased very rapidly in ranges which are relatively insensitive to rapid temperature rises, whereas the temperature of the elements is increased at a lower rate in ranges that are sensitive to rapid temperature rises.

The foregoing and other objects, features and advantages of the invention will be apparent from the following more particular description of preferred embodiments of the invention, as described in the examples and as illustrated in the accompanying drawings.

FIG. 1 is a perspective view of a typical electronic module substrate having land patterns and resistors printed thereon which is the more common subject item which can be treated by the method of this invention.

FIG. 2 is a schematic view in perspective illustrating a typical curing oven for continuously curing printed resistors or the like.

Figures 1, 2:
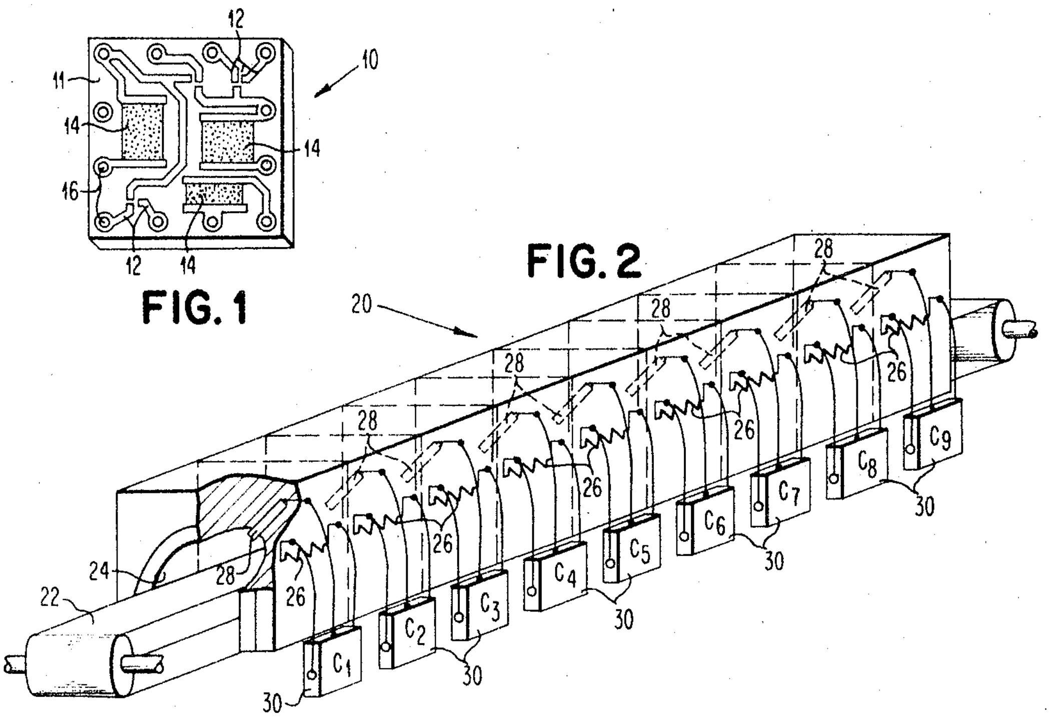

Referring now to FIG. 1 of the drawing there is depicted a typical electronic component 10 having a land pattern 12, printed resistors 14, and apertures 16 adapted to subsequently receive terminal pins. The substrate can be any suitable size and can be formed of any suitable high temperature insulating material capable of withstanding the curing temperatures which the resistors will be subjected to during firing.

In the production of an electrical component the substrate 11 is cleaned, the inner connection land patterns 12 printed on, and fired. The land pattern 12 is conventionally formed of inks containing noble metals such as gold, platinum, etc. The printing is done by stencil screening techniques. The resistors 14 are then printed from a suitable resistor composition and fired. The resistor composition or paste normally includes glass frit, an organic vehicle, and a metal-metal oxide conductive material. During firing the organic vehicle is driven out or burned off, the various components of the paste brought to an equilibrium condition, and the glass frit melted into a glaze. Copper pins (not shown) are thereafter inserted into holes 16 and heated. The entire module is thereafter solder tinned by immersing the unit into a bath of high temperature solder. This operation insures a good electrical connection between the pins and the lands, and lowers the series resistance of the lands.

In FIG. 2 is illustrated a typical furnace 20 having a conveyor 22, and a quartz muffle 24 enclosing the conveyor. The muffle 24 is divided into a plurality of zones, each zone having a resistance heating unit 26, a thermocouple 28, or other sensing element, and a controller 30. The controller 30 maintains a preset temperature environment in the zone by controlling the amount of heat added by the resistance element 26 in response to the thermocouple 28. The conveyor is normally driven at a constant speed by a suitable drive mechanism not shown. The conveyor can be provided with clamps to hold substrates or carriers for substrates. The muffle is usually enclosed with bricks and a metal cover. The muffle can be of any suitable length, contain any suitable number of zones, and also include a water cooling jacket at the exit end. Substrates are carried by the conveyor 22 through the muffle tube where they are exposed to various temperature environments along the length of the muffle 24 as set and controlled by the controllers 30. The speed of the conveyor 22, and the settings on the controllers 30 determine the type of heating profile that the substrates are subjected to within furnace 20.

Figure 3:
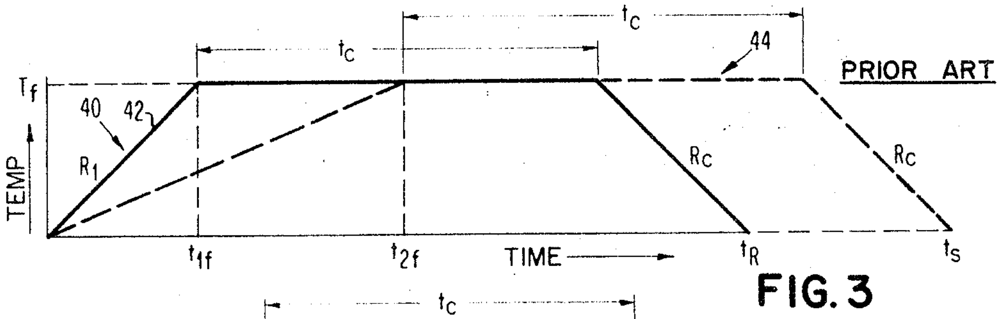
FIG. 3 is a graphic illustration of time versus temperature depicting typical idealized heating profiles known to the prior art.

In FIG. 3 are depicted idealized furnace profiles resulting from practicing the techniques known to the prior art. In practice, the actual profiles would not have the very straight lines and sharp well defined breaking points. However, the idealized profiles are useful to illustrate the objectives and indicate average temperature rise rates, firing intervals, temperatures, etc.

It would be desirable to have very rapid temperature rise rate so that the length of the furnace could be kept to a minimum. In profile 40 the temperature rise rate $R_1$ is indicated by the slope of line 42. The resistors being fired would then reach the firing temperature $T_f$ at time $t_{1f}$. However, a profile with a very rapid temperature rise rate $R_1$ is known to produce porous resistors that have poor stability characteristics. Stability characteristics, are a measure of the ability of the resistor to retain constant electrical resistances, constant temperature coefficient of resistances, and other related electrical operating properties over prolonged periods of operation. $R_2$ of profile 44 indicates for comparison the temperature rise rate which is sufficiently slow to produce dense resistors having acceptable stability characteristics. At rate $R_2$ which is the slope of line 46 of profile 44, the resistors being fired would reach the firing temperature $T_f$ at time $t_{2f}$. It is apparent that decreasing the temperature rise rate increases the length of the furnace since furnace length is equal to time multiplied by conveyor velocity (constant). The time that the resistors are held at the firing temperature $T_f$ is relatively constant and if anything is greater when a rapid temperature rise $R_1$ is used. Likewise, the temperature fall rate $R_c$ is substantially independent of the temperature rise rates. The temperature fall rate must be sufficiently slow to avoid setting up internal stresses in the resistor which might damage the glaze.

Therefore, a knowledge of the curing techniques of the prior art would lead one skilled in the art to select a temperature rise rate which would be a compromise between furnace capability and resistor quality.

Figure 4:
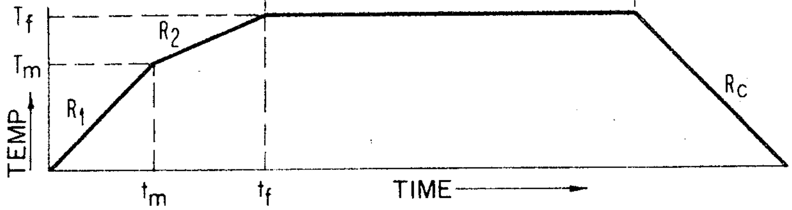
FIG. 4 is a graph of time versus temperature depicting a general idealized heating profile which would result from the practice of the method of this invention.

In FIG. 4 is illustrated an idealized furnace profile resulting from practicing the method of the invention. As indicated, the temperature of the resistors being cured is increased to temperature $T_m$ at a very rapid temperature rise rate $R_1$. $T_m$ is approximately the softening temperature of the glass frit of the resistor paste. The temperature is subsequently increased to the firing temperature $T_f$ at a relatively slow temperature rise rate $R_2$. Thus the instant profile utilizes a very rapid temperature rise rate for a large part of the heating of the resistor and achieves the attendant advantages in decreased equipment cost, etc. However, a slow temperature rise rate $R_2$ is used to heat the resistors to the firing temperature $T_f$ in the curing phase which has been discovered to be sensitive to rapid temperature rises. Thus the instant profile achieves substantially all of the significant advantages of rapid temperature rise rate and all of the advantages of a slow rise as known to the prior art without the attendant disadvantages. The time interval $t_c$ at which the resistors are held at the firing temperature, and the temperature fall rate $R_c$ is substantially the same as that practiced by the prior art. The determination of these rates and times is governed by the same considerations that apply in the heating profiles in FIG. 3.

In the curing of resistor compositions having a vehicle, glass frit, and a metal-metal oxide, it has been discovered that metal oxides are partially reduced and oxygen is initially involved from the molten glaze at elevated temperatures during firing. When the temperature increase or temperature rise rate above the melting point of the glaze is too fast, severe bubbling of the molten glaze results. Severe bubbling upon receding during the firing cycle leaves large voids in the resistor. If the bubbling continues through the interval at which the resistors are held at the firing temperature blisters are formed when the glaze freezes during the cooling phase. The voids are objectionable in resistors in that the cross-sectional area of the resistor is reduced at the point at which the void occurs. This causes a hot spot which may burn out and change the resistance of the element. Blisters are objectionable because they also reduce the cross-sectional area of the resistor, and also they are particularly prone to breakage etc. Breaking of a portion of the resistor also changes its electrical resistance and reduces stability characteristics. In general any voids, bubbles or thickness irregularities have a detrimental effect on the resistor.

We have discovered that below the melting temperature of the glass frit, the evolution of oxygen, if it does occur, does not have a significant detrimental effect on the resistor and that a rapid temperature rise rate could be used without detrimental effects. During this phase the vehicle is burned or driven off. However, when the temperature of the resistors reaches the softening point of the glass frit, a rapid evolution of oxygen produces detrimental results. Therefore, the temperature rise rate must be slow to slow the evolution of gas so as not to produce large voids and also render the paste composition nearer a state of equilibrium. The interval that the resistors are held at the firing temperature must be long enough to allow the metal-metal oxide to reach a state of equilibrium and also hold the glaze in a molten state to enable surface tension to close any gaps or holes formed by the evolution of gas.

In the practice of our invention the initial temperature rise rate below the softening point temperature of the glass frit should be at least 25° C. per minute, and more preferably from 30 to 60° C. per minute. In the interval when the resistors are heated from the softening point of the glass frit to the firing temperature the temperature rise rate should be decreased to at least one-third less than the average initial temperature rise rate. Preferably, the average temperature rise rate is less than 25° C. or preferably 10–25° C. per minute, still more preferably 15–20° C. per minute. In general, the firing temperature is from 80–150° C. above the melting point of the glass frit. The interval that the resistors are held at the firing temperature should be sufficient to place the metal-metal oxide system in equilibrium which will be evidenced by the termination of the evolution of gas. The interval will vary somewhat with different resistor compositions but is generally on the order of 20 to 30 minutes. The temperature fall rate can be as rapid as possible without setting up internal stresses which will crack the glaze. In general, the temperature fall rate will be on the order of 40 to 50° C. per minute.

The method of the invention is applicable to pastes which have a conducitve material of a metal-metal oxide type. Typical examples of such pastes are the palladium-palladium oxide system, the palladium-palladium oxide-silver system, the indium pastes and the like.

In the practice of the method of the invention, the substrates with resistors printed thereon are moved on a conveyor through a furnace of the type shown in FIG. 2. The temperature rise rates and temperature fall rates are controlled by correlating the conveyor speed and temperature environments in the various zones along the muffle tube. Any suitable number of the furnace zones can be used to carry out each of the given phases of the cure.

The following examples are included merely to aid in the understanding of the invention, and variations may be made by one skilled in the art without departing from the spirit and the scope of the invention.

EXAMPLE 1

A calculation comparison and discussion of required lengths, relative velocities and capacities of furnaces for curing resistors when used in accordance with well-known practices and when used for curing in accordance with the method of the invention was made. The calculation was for profiles wherein (1) the resistors heated to the firing temperature at a rapid average temperature rise rate of 45° C. per minute, (2) the resistors are heated to the firing temperature at a relatively slow average temperature rise rate of 22½%° C. per minute, and (3) the resistors are heated to the softening point of the glaze at a rapid average temperature rise rate of 45° C. per minute and thereafter heated to the firing temperature at a relatively slow average temperature rise rate of 22½° C. per minute in accordance with the method of the invention. The softening point of the glaze was 650° C., the firing temperature was 750° C., and the temperature of the resistances as they entered the heating zone was 300° C.

Rapid rise profile

| | Minutes |
|---|---|
| Rise 750—300° C.÷45° C./min. | 10 |
| Dwell, 750° C. | 13 |
| Fall, 750—300° C.÷45° C./min. | 10 |
| Total profile time | 33 |

Slow rise profile

| | Minutes |
|---|---|
| Rise, 750=300° C.÷22½° C./min. | 20 |
| Dwell, 750° C. | 13 |
| Fall, 750—300° C.÷45° C./min. | 10 |
| Total profile time | 43 |

Profile of invention

| | Minutes |
|---|---|
| 650—300° C.÷45° C./min. | 7.8 |
| Rise, 750—650° C.÷22½° C./min. | 4.5 |
| Dwell, 750° C. | 13.0 |
| Fall, 750—300° C.÷45° C./min. | 10.0 |
| Total | 35.3 |

A conveyor velocity of 5 inches per minute provides sufficient temperature control and will be used as a base velocity. The length of a furnace operated with a conveyor chain velocity of 5″ per minute necessary to perform the cure using a "rapid rise profile" is calculated as follows:

5″ per minute×1′ per 12″×33 minutes=13 ft. 9 in.

With a furnace having a constant length, the conveyor velocities necessary to carry out the remaining aforementioned curing methods are calculated as follows:

$$V_1t_1=V_2t_2$$

where V=belt speed and $t$=total profile time or $$V_2=\frac{V_1t_1}{t_2}$$

$V_2$ (slow rise profile) = 5″ per minute×

$$\frac{33\text{ minutes}}{35.3\text{ minutes}}=4.7\text{ inches per minute}$$

$V_3$ (profile of invention) = 5″ per minute×

$$\frac{33\text{ minutes}}{43\text{ minutes}}=3.83\text{ inches per minute}$$

The capacity of the furnace is directly proportional to the conveyor velocity. Using the rapid rise profile velocity of 5″ per minute as a standard, the relative capacity of the slow temperature rise profile is $$\frac{3.83''\text{ per minute}}{5''\text{ per minute}}=76.5\%$$

The rapid temperature rise profile is in general unsuited to produce resistors having the desirable physical and electrical characteristics. In order to produce the resistors of desirable quality in accordance with the teachings of the prior art; namely the slow rise profile the capacity of a given heating apparatus would be reduced to 76.5%.

However when the heating profile of the invention utilizing two temperature rise rates, the capacity is $$\frac{4.7'' \text{ per minute}}{5.0'' \text{ per minute}}=94\%$$

It can be seen that practicing the method of this invention results in only a 6% loss in capacity for a given apparatus. Stated another way, a loss of only 6% in volume capacity makes possible resistors of superior physical and electrical characteristics. In order to achieve a comparable increase in resistor improvement with methods known to the prior art, it would entail approximately a 24% decrease in capacity.

EXAMPLE 2

Twenty ceramic substrates, each measuring approximately one-half by one-half inches and approximately one-eighth inch in thickness were prepared by printing resistors and connecting land patterns thereon. Three resistors of varying sizes were screen printed on each substrate. The resistor paste used to print the resistors contained approximately 8% silver, 11.5% palladium, and 29.5% lead. The palladium to palladium oxide ratio was approximately 1 to 10. The paste also included a conventional organic vehicle. The resistor material had a resistivity of approximately 5000 ohms per square. Ten of the substrates were then cured in a continuous furnace, of the type described in Example 1, in accordance with profile 40 shown in FIG. 3. The resistors were subjected to an average temperature rise of 45° C. per minute in the temperature interval from 300 to 750° C., maintained at the firing temperature of 750° C. for thirteen minutes, and subsequently cooled at an average cooling rate of 45° C. per minute. The remaining ten substrates were cured in accordance with the curing profile of the invention as depicted in FIG. 4 of the drawings. The resistors were subjected to an average temperature rise of 45° C. per minute in the temperature interval between 300 and 650° C., an average temperature rise of 22½° C. per minute in the temperature interval from 650 to 750° C., held at the firing temperature of 750° C. for 13 minutes, and subsequently cooled at an average rate of 45° C. per minute. The resistances of each of the resistors were then measured and recorded. All of the substrates were then stored for 25 days in an environment maintained at 72° F. and a relative humidity of 40%. At the end of the storage period the resistances were again measured and the changes computed. The results of the tests are set forth in the table.

Table 1.—Storage effect

| | |
|---|---|
| Reistance drift: | |
| Old profile (FIG. 3) | +1.11 |
| New profile (FIG. 4) | +.83 |

As the above table indicates resistors cured in accordance with the old profile exhibited a significantly larger resistance drift than resistors cured in accordance with the new profile of this invention.

EXAMPLE 3

Twenty substrates, each having three resistors printed thereon, were prepared in the manner described in Example 2. Ten of the substrates were then cured in accordance with the old profile, and the remaining ten cured utilizing the new profile as described in Example 2. The resistances of the resistors were then measured and recorded. The substrates were then stored for 250 hours in a temperature environment of 150° C. At the end of 250 hours the resistances of the resistors were again measured, and the drift calculated and recorded. The results are set forth in Table 2.

Table 2.—High temperature storage

| | |
|---|---|
| Resistance drift: | |
| Old profile (FIG. 3) | +2.72 |
| New profile (FIG. 4) | +1.89 |

As the above table indicates resistors cured in accordance with the new profile of the invention showed significantly less resistance drift than resistors cured in the conventional manner

EXAMPLE 4

Twenty substrates were again prepared in the manner described in Example 2. Ten of the substrates were cured in accordance with the old profile, and ten in accordance with the new profile, as also described in Example 2. The substrates were then placed in a production line and processed through a resistor trimming operation with the values of the resistors adjusted to selected values. The substrates continued on through a standard production line wherein semiconductor elements were positioned on the land pattern, and the entire substrate heated to fuse the transistor terminals to the land pattern. Thereafter, the substrates were encapsulated and subjected to an encapsulation cure. The resistances of the resistors on the substrates were then measured. Process drift of resistance calculated. The results are set forth in Table 3.

Table 3.—Process drift

| | |
|---|---|
| Resistance drift: | |
| Old profile (FIG. 3) | +4.03 |
| New profile (FIG. 4) | +1.43 |

As the above table indicates the resistors cured in accordance with method of this invention exhibited significantly less resistance drift.

We claim:

1. A continuous method of curing electrically conductive elements adhered to a substrate and formed of a paste mixture including glass frit, a vehicle, and a metal-metal oxide conductive material comprising:

initially heating the elements in a first zone up to a first temperature approximately equal to the softening temperature of the glass frit at an average initial temperature rise rate not less than 25° C. per minute, heating the elements in a second zone up to a second temperature of from 80–150° C. above said first temperature at an average temperature rise rate at least one-third less than the average initial temperature rise rate, maintaining the elements in a third zone at said second temperature until the evolution of gas is substantially terminated, and subsequently cooling the elements in a fourth zone.

2. The method of claim 1 wherein the respective temperature environments in said first, third and fourth zones are maintained by an elongated furnace, and said conductive elements are moved through said zones by a conveyor moving at a constant velocity.

3. The method of claim 2 wherein said average temperature rise rate of said conductive elements in said first zone is in the range of 30–60° C. per minute, and the average temperature rise rate of the conductive elements while in said second zone is in the range of 10–25° C. per minute.

4. The method of claim 3 wherein the conductive elements are maintained at said second temperature in said third zone for an interval in the range of 8–30 minutes and until the paste mixture reaches a substantially equilibrium condition, and the cooling of the conductive elements in said fourth zone occurs at an average temperature fall rate of from 30 to 60° C. per minute.

5. The method of claim 2 wherein said paste mixture of said conductive elements includes a metal-metal oxide conductive material of palladium-palladium oxide in an amount in the range of 7 to 12% by weight, the conductive elements are heated in said first zone at an average temperature rise rate of from 40 to 50° C. per minute, and the conductive elements are subsequently heated in said second zone at an average temperature rise rate in the range of 15 to 25° C. per minute.

6. The method of claim 5 wherein said conductive elements are heated in said first zone to a temperature in the range of 625 to 675° C., and are heated in said second zone to a temperature in the range of 750 to 777° C.

7. The method of claim 6 wherein the conductive elements are maintained at a temperature in the range of 750 to 770° C. in said third zone for a time interval in the range of 15 to 30 minutes, and the conductive elements are cooled in said fourth zone at an average rate of from 40 to 50° C. per minute.

8. The method of claim 2 wherein the paste mixture of the conductive elements has a conductive material having 5 to 15% silver, and 7 to 12% palladium and palladium oxide with the ratio of palladium to palladium oxide being approximately 1 to 4, and the conductive elements are heated in said first zone to a temperature of approximately 650° C. at an average temperature rise rate of approximately 45° C. per minute, and the conductive elements are subsequently heated to a temperature of approximately 760° C. in said second zone at an average temperature rise rate of approximately 22½° C. per minute.

9. The method of claim 8 wherein the conductive elements are maintained in said third zone at a temperature of approximately 750° C. for an interval of approximately 20 minutes, and the elements are subsequently cooled in said fourth zone at an average temperature fall rate of approximately 45° C. per minute.

References Cited

UNITED STATES PATENTS

| | | | |
|---|---|---|---|
| 2,950,996 | 8/1960 | Place et al. | 117—227 |
| 3,079,282 | 2/1963 | Haller et al. | 117—212 |
| 3,252,831 | 5/1966 | Ragan | 117—227 X |

WILLIAM L. JARVIS, Primary Examiner

U.S. Cl. X.R.

29—620; 106—1; 117—119.6; 252—514